United States Patent [19]

Guidicelli

[11] Patent Number: 4,494,719
[45] Date of Patent: Jan. 22, 1985

[54] DEVICE FOR FIXING A FLEXIBLE CONDUIT TO A PANEL

[75] Inventor: Charles Guidicelli, Noyen, France

[73] Assignee: Societe Anonyme D.B.A., Paris, France

[21] Appl. No.: 461,828

[22] Filed: Jan. 28, 1983

[30] Foreign Application Priority Data

Feb. 15, 1982 [FR] France ............................ 82 02421

[51] Int. Cl.³ ............................................ G12B 9/00
[52] U.S. Cl. .................................. 248/27.1; 403/195; 403/197
[58] Field of Search ............... 248/27.1, 27.3, 56; 174/153 G, 65 G; 339/103; 403/194, 195, 196, 197, 201

[56] References Cited

U.S. PATENT DOCUMENTS

| | | | |
|---|---|---|---|
| 2,664,458 | 12/1953 | Rapata | 174/153 G |
| 2,892,011 | 6/1959 | Glueckstein | 248/27.3 |
| 3,221,572 | 12/1965 | Swick | 248/56 |
| 3,631,738 | 1/1972 | Harper | 174/65 G |
| 3,929,031 | 12/1975 | Webb | 403/197 |
| 4,299,363 | 11/1981 | Datschefski | 174/153 G |
| 4,304,148 | 12/1981 | Hamman | 248/27.3 |
| 4,324,503 | 4/1982 | Sevrence | 285/162 |
| 4,361,302 | 11/1982 | Lass | 248/56 |

*Primary Examiner*—Ramon S. Britts
*Assistant Examiner*—Ramon O. Ramirez
*Attorney, Agent, or Firm*—Larry J. Palguta; Ken C. Decker

[57] ABSTRACT

The device (20) for fixing to a panel (14) a flexible conduit (12) in which a control cable (10) is housed and able to slide, comprises a cable fitting (22) joined to the conduit (12) and intended to be received in an opening (15) of the panel (14), the fitting (22) having an abutment surface (30) intended to bear against one face (15) of the panel (14), the end (24) of the conduit (12) extending beyond the free end (28) of the fitting (22) which extends on the other face (17) of the panel (14).

The fitting (22) is provided with gripping means (40) whose jaws (42, 44), when tightened, are capable of pressingly engaging frictionally the outer surface (25) of the conduit (12) to immobilize the latter axially relative to the fitting (22), the latter (22) also being provided with clamping means (50) able to cause the tightening of the jaws (42, 44).

10 Claims, 8 Drawing Figures

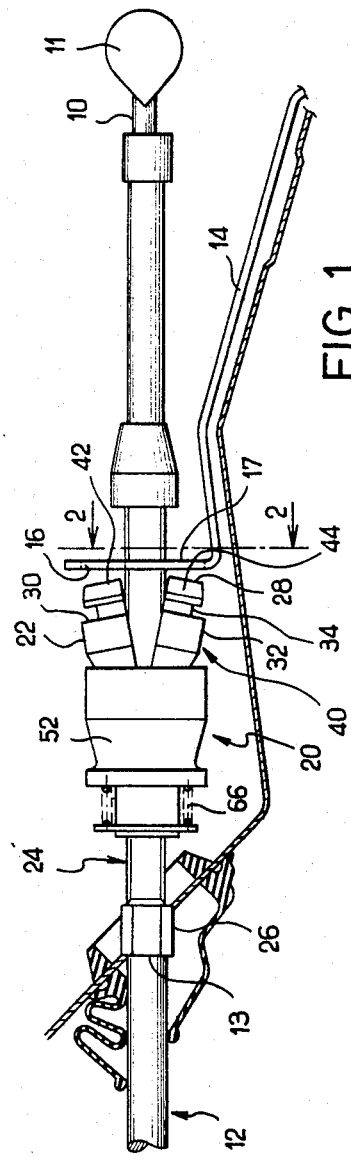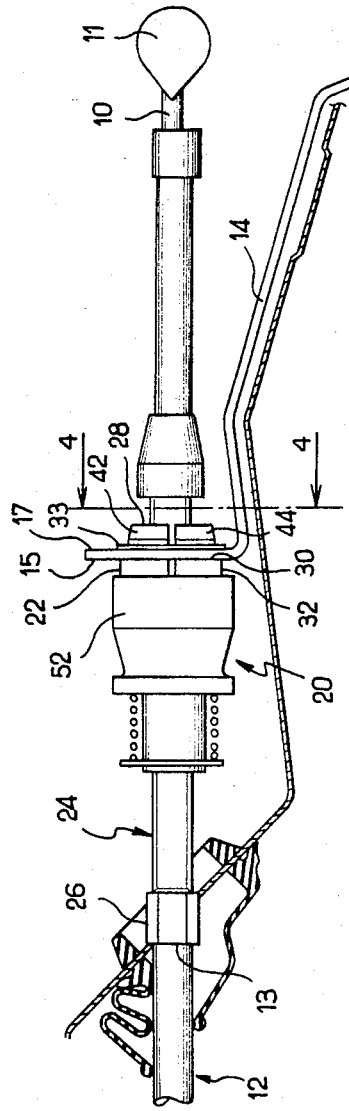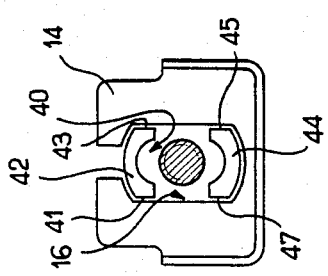

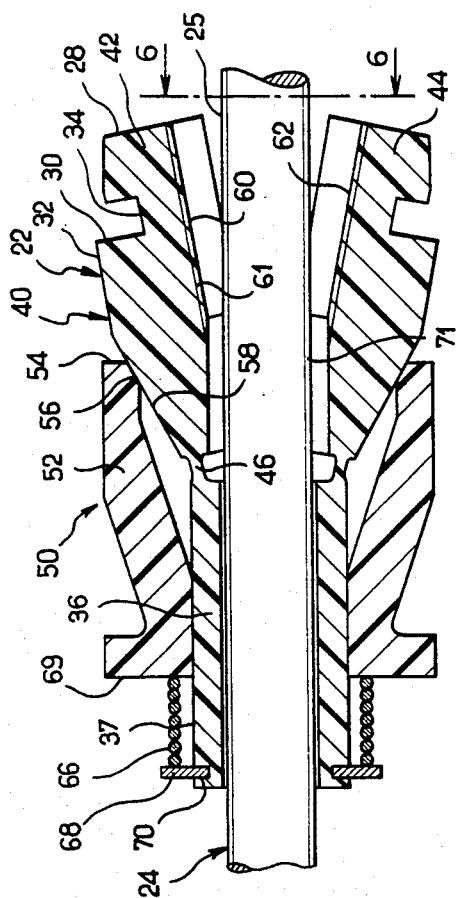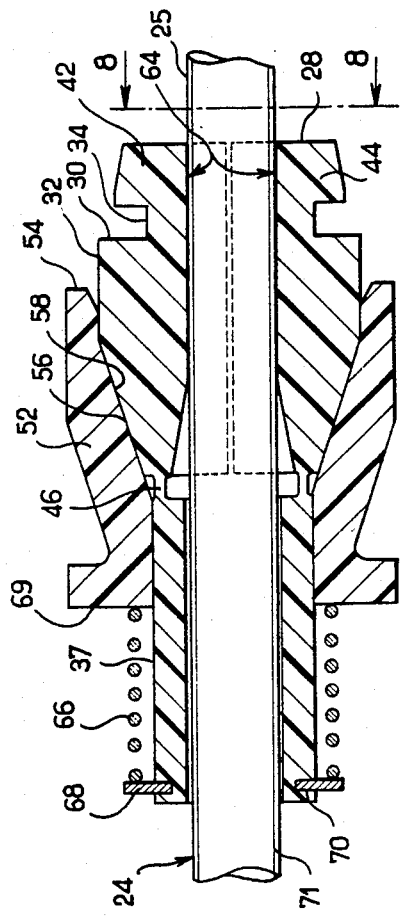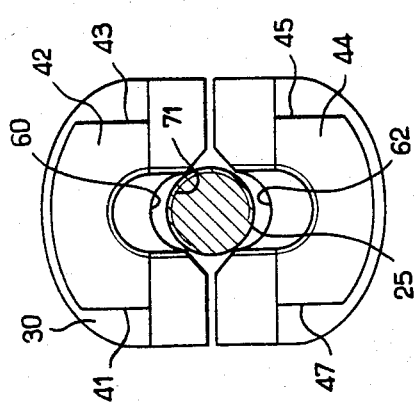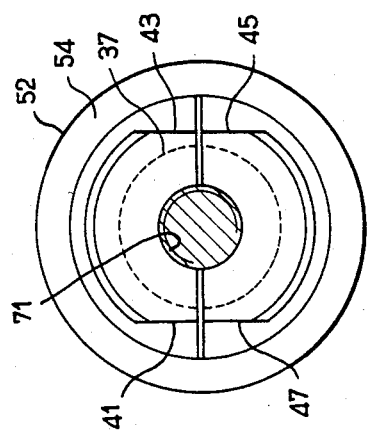

DEVICE FOR FIXING A FLEXIBLE CONDUIT TO A PANEL

The present invention relates to devices for fixing to a panel a flexible conduit in which a control cable is housed and able to slide.

The fixing device is of the type comprising a conduit fitting joinable to the cable conduit adjacent one end thereof. The conduit fitting is intended to be received within an opening in a panel and therefor is provided wiht an abutment surface intended to bear against one face of the panel. A fixing device of such a type is described, in particular in European Patent Application No. 0-060-735 which relates more particularly to a conduit end fitting adaptable to one end of the conduit of a control cable of the type generally used on motor vehicles for controlling the brakes or a friction clutch. The device described permits convenient installation of the control cable to be carried out in the vehicle, whatever the manufacturing tolerances of the vehicles, by means of a locking device enabling the end of the conduit to be immobilised axially relative to the end fitting after installation of the control cable in the vehicle. In the different embodiments illustrated in this prior Application, the locking means consists in a gripping system with balls, situated between a frustoconical bearing surface of the fitting and the outer surface of the end of the conduit.

It is established from experience that a device of such a type with gripping by balls does not permit very high forces to be transmitted by the control cable without risking damage to the outer surface of the conduit which may result in undesirable axial displacements of this end relative to the fitting.

One object of the invention is to propose a device for fixing to a panel a flexible conduit in which a control cable is housed and able to slide, of the type comprising a fitting joinable to said conduit adjacent one end thereof and intended to be received in an opening formed in the said panel, said fitting being provided with an abutment surface intended to bear against one face of the said panel, wherein said end of the conduit extends beyond the free end of said fitting which emerges on the other face of the said panel, said fitting being of simple configuration, low fabrication cost, easy manipulation, and exhibiting improved releability.

With this arm, the invention proposes a fixing device of the above type wherein the fitting is provided with gripping means having jaws which, when tightened, are capable of pressingly engaging frictionally the outer surface of the said conduit to immobulize the latter axially relative to said fitting, said device also including axially movable clamping able to cause tightening of said jaws.

It will be seen that such a device eliminates the disadvantages of the systems for gripping by balls, allows free positioning of the end of the conduit extending beyond the fitting during installation of a vehicle before easily and firmly fixing the conduit in place to the panel.

Thus, said arrangement enables the in situ installation of the conduit in the vehicle to be carried out independently of the manufacturing tolerances of the latter, with the twofold advantage of being able, on the one hand, to adjust the conduit axially with respect to the fitting, and, on the other hand, to immobilize the fixing device relative to the panel once a preadjustment of the conduit length has been effected.

Illustrative embodiments are now described of a fixing device according to the teachings of the present invention, with reference to the accompanying drawings in which:

FIG. 1 is an external side view of a fixing device according to the present invention, installed on a control cable of the "push-pull" type, in which the fixing device is shown in the open position as when installing the cable in a vehicle;

FIG. 2 is a sectional view on the line 2—2 in FIG. 1;

FIG. 3 is an external side view of the fixing device in FIG. 1, shown in the closed position;

FIG. 4 is a sectional view on the line 4—4 in FIG. 3;

FIG. 5 is an enlarged sectional view of the fixing device in FIG. 1;

FIG. 6 is a sectional view on the line 6—6 in FIG. 5;

FIG. 7 is an enlarged sectional view of the fixing device in FIG. 3, in the closed position; and FIG. 8 is a sectional view on the line 8—8 in FIG. 7.

FIG. 1 shows part of a mechanical remote control of the "push-pull" type, comprising a flexible control cable 10 housed and able to slide axially in a flexible cylindrical conduit 12. In order to simplify the illustration, only one of the two ends of the flexible conduit 12 is shown. The flexible conduit 12 is fixed to a panel 14 by means of a fixing device 20. The fixing device 20 includes a fixing fitting 22 intended to be received in an opening 16 formed in the panel 14. In the embodiment illustrated, the actual end of the flexible conduit 12 consists of a portion of rigid tube which is secured to the end 13 of the flexible part of the conduit 12 by means of a crimping ring 26. As may be seen in FIG. 2, the end of the conduit, consisting of the tube 24, extends beyond the free end 28 of the fitting 22. As may be seen in FIG. 3, when the fixing device is in the closed or lock position and the control cable is installed, the fitting 22 bears against one face 15 of the panel 14 by means of an abutment surface 30 consisting of the straight lateral annular wall of a shoulder 32 of the fitting 22. The face end 28 of the fitting emerges on the other face 17 of the panel 14. The fitting 22, and hence the fixing device assembly 20, is immobilized in position relative to the panel 14 by means of a ring or circlip 33 which is housed elastically in a groove 34 formed in the fitting 22 adjacent the lateral face of the said shoulder 32.

According to the invention, the fixing device 20 is characterized in that the fitting 22 is provided with a pincer or gripping means. As may be seen in greater detail in FIGS. 5 and 7, the fitting 22 in fact is comprised of a cylindrical sleeve portion 36 slipped over the end of the conduit 24 and extended by the said pincer 40. The sleeve 36 being made of plastic, the pincer 40 is formed in one piece with the sleeve 36 and consists of at least two jaws 42 and 44. The jaws 42 and 44 are shaped in the form of two semicylindrical shells which meet together when the pincer is tightened, as may be seen in FIG. 7, to substantially form a cylindrical extension of the sleeve 36 in the form of a cylindrical ferrule whose end has a conventional profile of a cable conduit fitting. The jaws 42 and 44 of the pincer 40 are each hingedly connected to the sleeve 36 by a portion of reduced thickness 46 of the latter 36. The portion 46 of reduced thickness thus takes the shape of a tongue whose flexibility allows the hinging of each jaw relative to the sleeve 36.

According to the invention, the fixing device is also provided with clamping means 50 for selectively clamping the jaws 42 and 44 around an inner member, e.g.

conduit. The clamping means 50 consists of a tubular sleeve or ring 52 slidingly mounted on the outer cylindrical surface 37 of the sleeve 36 in such a way that the clamping rings 52 may be moved axially relative to the sleeve 36. The clamping ring 52 is provided innerly, in the region of its end 54 directed towards the jaws 42 and 44, with a substantially frustoconical cam profile 56 capable of engaging a complementary frustoconical outer cam profile 58 formed on the outer wall of each of the jaws 42 and 44. It will be seen that the engagement between the cam profile 56 and the cam profile 58 upon relative axial displacement of ring 52 and pincer 40 constitutes means forming a ramp, which make it possible to apply pressure to the said jaws by axial displacement of the ring 52 towards the right (as shown in the drawings) to force the jaws 42 and 44 to pivot about their hinge 46 and thereby cause a gripping frictionnal engagement between the inner walls 60 and 62 of the jaws 42 and 44 and the outer surface 25 of the end portion 24 of the conduit.

In the embodiment illustrated, the inner wall of the jaws 42 and 44 consists of the inner wall of a cylindrical bore 64 which is completed when the two jaws are in the tightened position. The clamping means 50 also includes a clamping spring 66. The clamping spring 66 consists of a helical spring which is positioned concentrically with the outer surface 37 of the sleeve 36, and which bears at one end onto a shoulder portion 68 formed on the outer surface 37 of the sleeve 36 at one end thereof, so as to exert an axial resilient force on the clamping ring 52 in the direction towards the jaws 42 and 44, in order to naturally effect inward pivoting, e.g. tightening the jaws 42 and 44 by means of the cam profiles 56 and 58. The helical spring 66 is mounted compressed between the shoulder portion 68 and the adjacent lateral annular end face 69 of the clamping ring 52 onto which it bears for biasing same.

In the embodiment illustrated, the shoulder portion 68 consists of a circlip engaged in a groove 70 formed in the outer surface 37 of the sleeve 36.

In order to improve the frictional engagement between the inner walls of the jaws 42 and 44 and the outer wall 25 of the conduit, the inner walls of the jaws are advantageously provided with notches or serrations which engage complementary notches or serrations formed in the outer surface 25 of the conduit. In the embodiment illustrated, the notches consist of an internal thread formed in the inner cylindrical wall 64 completed by the meeting of the inner walls 60 and 62 of the jaws 42 and 44. The thread 61 thus formed engages a thread 71 of complementary pitch and complementary nominal diameter, formed on the outer wall 25 of the portion of rigid tube 24 forming the end of the conduit 12. It should be understood that, in an alternative embodiment, not illustrated, in which the end of the conduit would consist in a helically wound wire in order to make the end flexible, the thread 61 formed in the inner walls of the jaws 42 and 44 would have a profile complementary to that of the outer surface of the conduit which is formed by the helical winding of the said wire and which effectively has a thread profile.

In the embodiment just described, the pincer 40 consists only of two semi-cylindrical jaws 42 and 44, but it is understood that the pincer could be made up of a greater number of jaws, each one of which would consist of a circular sector of the cylindrical shell which they would form in the closed position, this shell having a profile identical or similar to that formed by the two jaws 42 and 44 of the embodiment illustrated.

Installation and fixation of the conduit and the control cable 10 in the panel 14 by means of the fixing device 20 will now be disclosed, referring particularly to FIGS. 1 and 3. When an operator wishes to install the control cable in a motor vehicle, for example, he must start by attaching the two ends of the control cable 10 to the corresponding actuating and actuated parts. In the embodiment illustrated in FIG. 1, the end of the cable 10 can, for example be connected to the control lever of an automatic gearbox. The operator must then immobilize axially the first end of the conduit 12 (which is not shown in the drawings), for example by means of a conventional conduit end fitting, that is to say a fitting of the type which does not allow for adjustment of the position of the conduit with respect to the ferrule. This first conduit end is thus immobilized relative to a fixed support connected to the vehicle chassis and of which the panel 14 is a part. In order to proceed to the installation of the fixing device and to the adjustment of the conduit length, the operator must cause the pincer 40 to open so that the jaws of the latter take up the position shown in FIG. 1. To achieve this, the operator applies pressure to the clamping ring 52 in opposition to the force of the clamping spring 66 in order to allow the jaws 42 and 44 to naturally open. The fitting, consisting of the sleeve 36 and the jaws 42 and 44 being made of plastic, it is desirable to ensure that, at the time of molding this component, the jaws normally take up an open position when a force is applied to the clamping ring 52 to move rame toward the left. In this position, it will be seen that the fitting 22 may be freely displaced axially relative to the end portion of the conduit 24. After having completed installation of the cable control, the operator is able to slide the fixing device assembly axially along the conduit to bring the front abutment surface 30, formed on the jaws of the fitting 22, into contact with the adjacent face 15 of the panel in the required position for fixing the conduit to the panel. In this latter position, the operator has only to cause tightening of the pincer 40 onto the outer surface 25 of the conduit by actuating the clamping means consisting of the ring 52, that is to say releasing the latter which, under the effect of the elastic biasing force exerted by the spring 66, will move to the right and cause the frictional engagement of the jaws 42 and 44 due to the cam profiles 56 and 58 described above. In this way, the engagement of the inner walls 60, 62 of the jaws 42 and 44 with the outer wall 25 of the conduit 12 will cause the latter to be immobilized relative to the fixing device 20. The components of the fixing device then occupy the position shown in FIGS. 3 and 7, and it only remains for the operator to immobilize permanently the fixing device 20 relative to the panel 14. To achieve this, the operator introduces transversally the immobilising ring 33 into the groove 34 provided for this purpose, which in the embodiment shown forms the abutment surface 30 and extends axially on the same side as the face 17 of the panel 14. As may be seen particularly in FIG. 4, the immobilizing ring may be introduced vertically into the groove 34. When in place, the immobilizing ring engages the face 17 of the panel 14 to prevent any axial movement of the fixing device 20 relative to the latter, the panel being clamped between the abutment face 30 of the shoulder 32 and the face of the fixing ring adjacent the face 17 of the panel, the ring 33 further preventing the jaws to be inadvertently spread apart, thus completing, is a locking fashion, the action of the clamping ring 52.

In order to prevent any undesirable rotation of the fixing device 20 and thereby of the conduit 12, and to enable better positioning of the fixing device 20 in the opening 16 arranged in the panel 14, as may be established from FIGS. 2, 4, 6, and 8, the free ends of the jaws 42 and 44 are provided with paired flat faces 41, 43, 45 and 47. These paired flat faces engage with the contour 49 of the opening 16, which has a complementary profile, that is to say its two lateral edges are straight and spaced apart by a distance corresponding to the distance between the paired faces 41 and 43, 45 and 47 respectively. According to another aspect of said embodiment, the substantially rectangular opening 16 in the panel 14 is prolongated upwardly by a slot 72 which open towards the outside and which permits the end of part of the jaws of the fitting 22 to be introduced by passing the peripheral groove 34 of the jaws through the slot 72. This detail of the embodiment allows in particular the installation of the fixing device to be carried out even when the fixing means provided at the end 11 of the control cable 10 would not permit the latter to be passed through the opening 16 arranged in the panel, by simple axial introduction into the latter, the transverse introduction of the fitting 22 into the opening 16 then permitting the fixing of the device to the panel 14 to be carried out in a manner similar to that described above.

I claim:

1. A device for fixing to a panel a flexible conduit in which a control cable slidably extends, including a fitting joinable to said conduit adjacent one end thereof and intended to be received in an opening formed in said panel, said fitting being provided with an abutment surface intended to bear against one face of said panel, said end of said conduit extending beyond the end of said fitting which emerges on the other face of said panel, said fitting comprising a pincer having jaws which, when tightened, are capable of engaging frictionally the outer surface of the said conduit to immobilize the latter axially relative to said fitting, and clamping means able to cause tightening of said jaws, wherein said pincer is formed in the prolongation of a cylindrical sleeve, said jaws being hingedly connected to said sleeve and forming, adjacent their free ends opposite to said sleeve, said abutment surface, said clamping means including a ring slidingly mounted on said cylindrical sleeve and having ramp means cooperating with said jaws for causing the latter to pivot towards said outer surface of said conduit and to cooperate in frictional engagement with the latter when said ring is moved axially relative to said sleeve in the corresponding direction.

2. A fixing device according to claim 1, wherein said clamping means includes a clamping spring which bears on a shoulder formed on said sleeve so as to exert a resilient force on said clamping ring and to urge ring in the direction corresponding to the tightening of said jaws.

3. A fixing device according to the claim 2, wherein said sleeve is made out of a plastic material, said jaws being formed integral with said sleeve, each being connected to said sleeve at one end by means of a tongue forming a hinged connection of the jaw to the sleeve.

4. A fixing device according to claim 3, wherein each of said jaws comprising a circular sector of a cylindrical shell, having an inner wall engaging frictionally said outer surface of said conduit when said clamping means is actuated, said ramp means consisting of cam profile means formed innerly on said clamping ring and of corresponding complementary profile means formed on the outer wall of each of said jaws.

5. A fixing device according to claim 4, wherein said jaws are provided innerly with serrations.

6. A fixing device according to claim 5, wherein said serrations consist of an internal thread formed in said cylindrical shell sectors.

7. A fixing device according to claim 6, further including a rigid tube comprising said end of said conduit and provided on its outer periphery with a thread whose pitch and nominal diameter are complementary to said internal thread (61) of said jaws.

8. A fixing device according to claim 6, for immobilizing a conduit whose outer surface is formed of a helicoidally would wire, wherein said internal thread of said jaws has a profile and a pitch complementary to the profile of said outer surface of said conduit.

9. A fixing device according to claim 4, wherein said abutment surfaces formed on each of said jaws consist of a corresponding sector of an external cylindrical shoulder.

10. A fixing device according to claim 1, wherein each of said jaws is formed, adjacent its said free end, with a corresponding sector of a groove (34) forming said abutment surface (30) and intended to house an immobilizing ring engaging the other face of said panel to immobilize axially said fixing device relative to said panel and to prevent any undesirable separation of said jaws of said pincer.

* * * * *